United States Patent [19]
Cannon, Jr. et al.

[11] Patent Number: 6,092,975
[45] Date of Patent: *Jul. 25, 2000

[54] MOBILE WRECKER INCORPORATING IMPROVED REAR OUTRIGGER SUPPORT ARRANGEMENT

[75] Inventors: Fleming V. Cannon, Jr., Flintstone, Ga.; John L. Hawkins, III, Hixson; Ralph E. McConnell, Chattanooga, both of Tenn.

[73] Assignee: Miller Industries Towing Equipment, Inc., Ooltewah, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,862

[22] Filed: Mar. 25, 1997

[51] Int. Cl.[7] ..................................................... B66C 23/78
[52] U.S. Cl. ........................ 414/563; 280/402; 280/766.1; 212/302; 212/304
[58] Field of Search ..................................... 212/302, 304; 414/426, 563, 427, 428; 280/766.1, 763.1, 764.1, 765.1; 254/418, 423

[56] References Cited

U.S. PATENT DOCUMENTS

| | | | |
|---|---|---|---|
| 3,716,252 | 2/1973 | Johnson | 280/150.5 |
| 4,084,777 | 4/1978 | Lambert | 248/287 |
| 4,116,467 | 9/1978 | Ewert | 280/764 |
| 4,383,617 | 5/1983 | Hychalk | 212/304 |
| 4,424,985 | 1/1984 | Holmes | 280/766.1 |
| 4,531,882 | 7/1985 | Pierre | 212/304 X |
| 4,607,862 | 8/1986 | Deram et al. | 280/765.1 |
| 4,640,660 | 2/1987 | Watson | 414/563 |
| 4,700,852 | 10/1987 | Mjöberg | 212/302 X |
| 4,790,710 | 12/1988 | Ayalon | 414/563 |

FOREIGN PATENT DOCUMENTS

| | | | |
|---|---|---|---|
| 138040 | 10/1981 | Japan | 212/302 |
| 1331814 | 8/1987 | U.S.S.R. | 212/304 |

*Primary Examiner*—Frank E. Werner
*Attorney, Agent, or Firm*—Zarley, McKee, Thomte, Voorhees & Sease

[57] ABSTRACT

A rear hydraulic outrigger assembly for a rotator or similar mobile wrecker wherein the rear outriggers are constructed and arranged to diverge rearwardly from the outrigger and are capable of outward lateral extension for increased stability. The rear outrigger includes a vertically extending portion and horizontally extending position which can be telescopically extended away from the rotator thereby increasing stability during loaded operation. This allows a large vehicle which requires rear stabilization room in the center part thereof for an underlift or similar structure while maintaining down and out stabilization advantages.

15 Claims, 6 Drawing Sheets

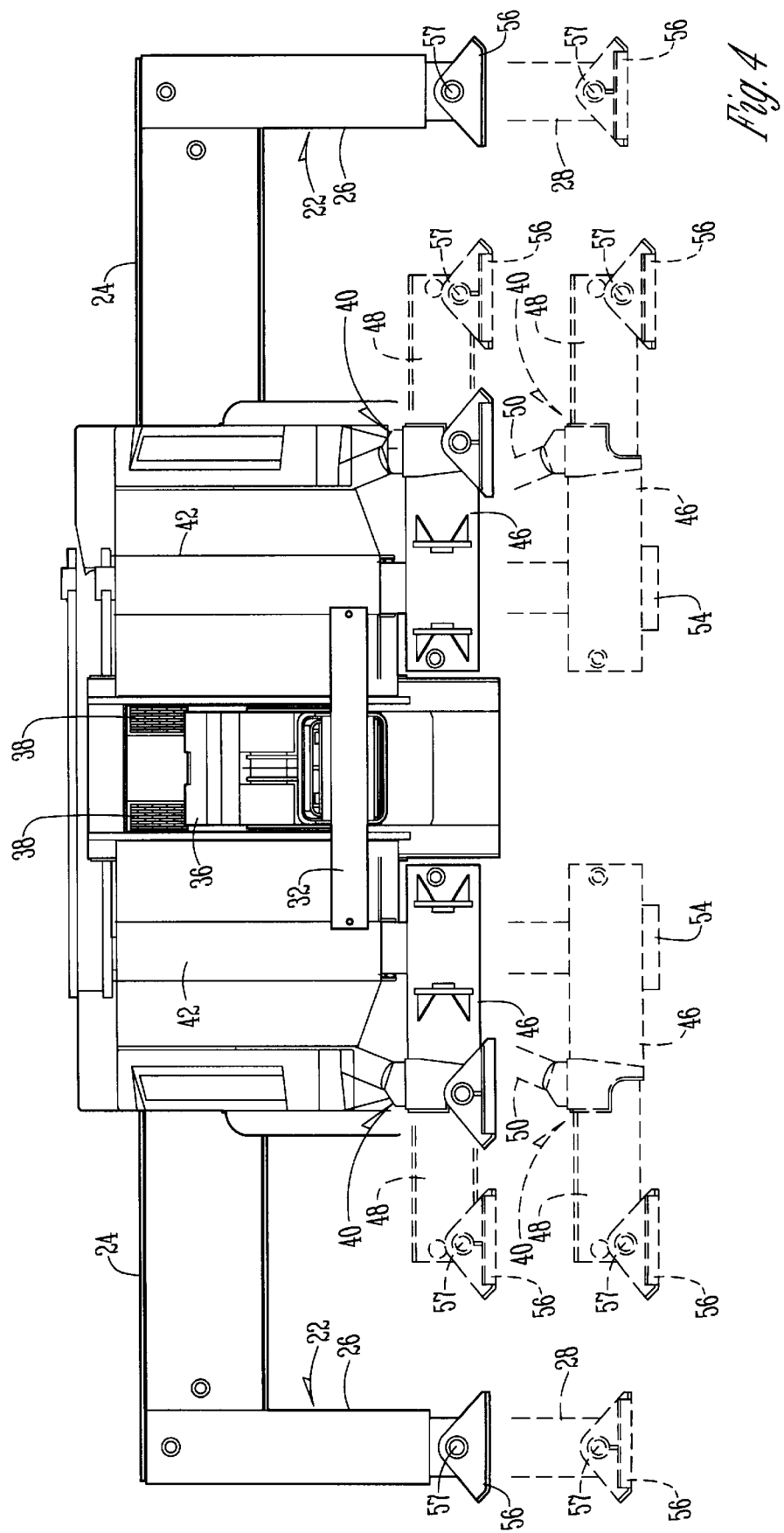

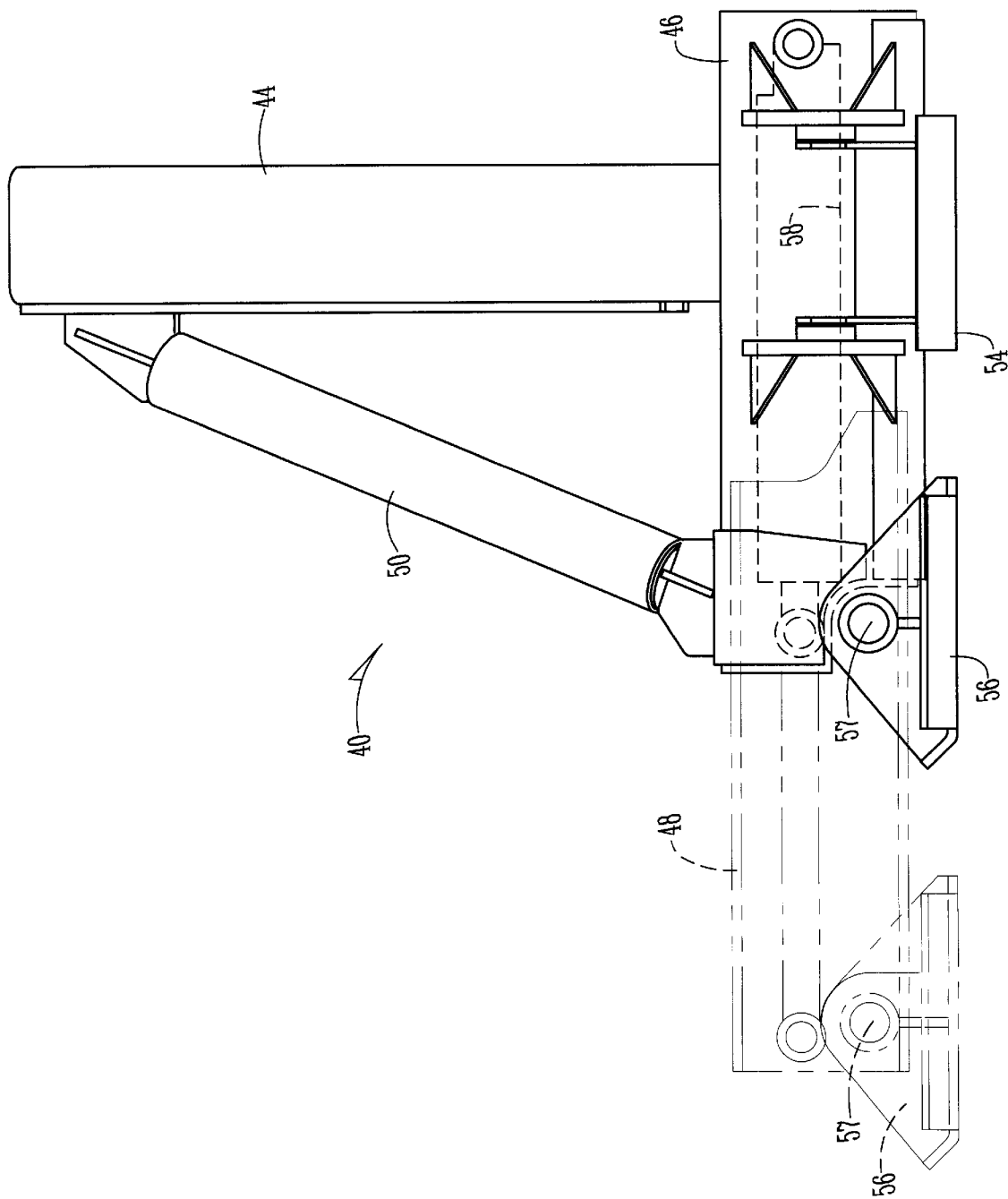

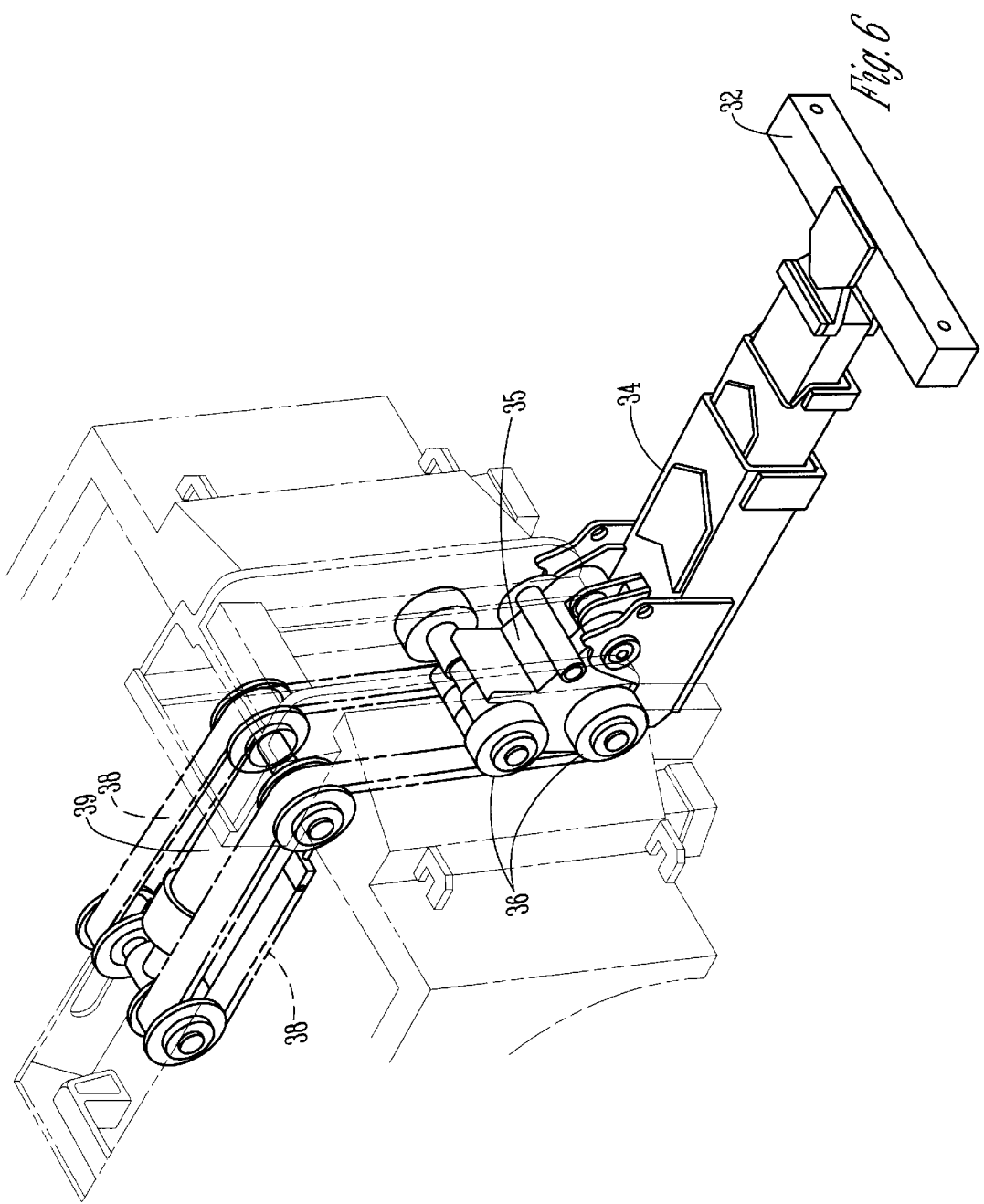

6,092,975

MOBILE WRECKER INCORPORATING IMPROVED REAR OUTRIGGER SUPPORT ARRANGEMENT

BACKGROUND OF THE INVENTION

It is conventional to provide heavy duty wreckers and like machines such as mobile cranes and backhoes with hydraulic outriggers for stabilizing the vehicle while performing its anticipated function. Specifically in the field of heavy duty wreckers, sometimes referred to as a rotator because of the ability of their boom to rotate about a vertical axis 360 degrees, a hydraulic outrigger system provides superior stability through a variety of lifting and recovery situations. The outriggers found in the prior art include a cylinder-piston type fluid motor having the ground engaging pad connected to the outer end of the piston rod and the cylinder connected to the vehicle frame. These outriggers are mounted on the vehicle in such a manner that when extended to the operative position, they are disposed in either an oblique or divergent attitude, or a substantially vertical attitude relative to the vehicle. While these outriggers have been satisfactory for their intended function of stabilizing the vehicle, it is desirable to increase the distance of the outrigger's extension from the vehicle for additional stability in given situations. In other situations, such as where space is not adequate to allow full extension, a shorter outrigger base might be preferable. The ability to have extensible outriggers is magnified in the situation of heavy duty or super heavy duty hydraulic wreckers because of the presence of a rear underlift which may be used to tow a disabled vehicle. This underlift must generally be capable of lowering to ground level and lifting a vehicle to be towed.

To overcome the disadvantages experienced with vehicles which require rear outriggers but which also include an underlift, the vehicle may be provided with outriggers that are capable of extending their ground engaging element from the rotator in a generally horizontal fashion. This two stage extension allows a greater width of support by widening the base of the outrigger. The outrigger assembly of the present invention is an improvement over the prior art by allowing this extensible movement to occur at a greater distance from other outriggers and, in the preferred embodiment, outside the perimeter of the wrecker. The foot of the outrigger extends rearwardly away from the wrecker and, when positioned, will extend outwardly and laterally away from the wrecker to increase and maximize the stabilization effect.

BRIEF DESCRIPTION OF THE FIGURES OF THE DRAWINGS

FIG. 4 is a rear elevational view of the rotator illustrated in FIG. 1 with rear outriggers in both the stored, in operative position with extending lines showing the operative, ground engaging position relatively thereto. The front outriggers are shown in the extending position with dotted lines showing the ground engaging position.

FIG. 5 is an enlarged view of an enlarged fragmentary elevational view of one of the outriggers of the present invention.

FIG. 6 is a perspective view of the underlift element of the present invention.

DETAILED DESCRIPTION OF THE PREFERRED EMBODIMENT

Figure 1:
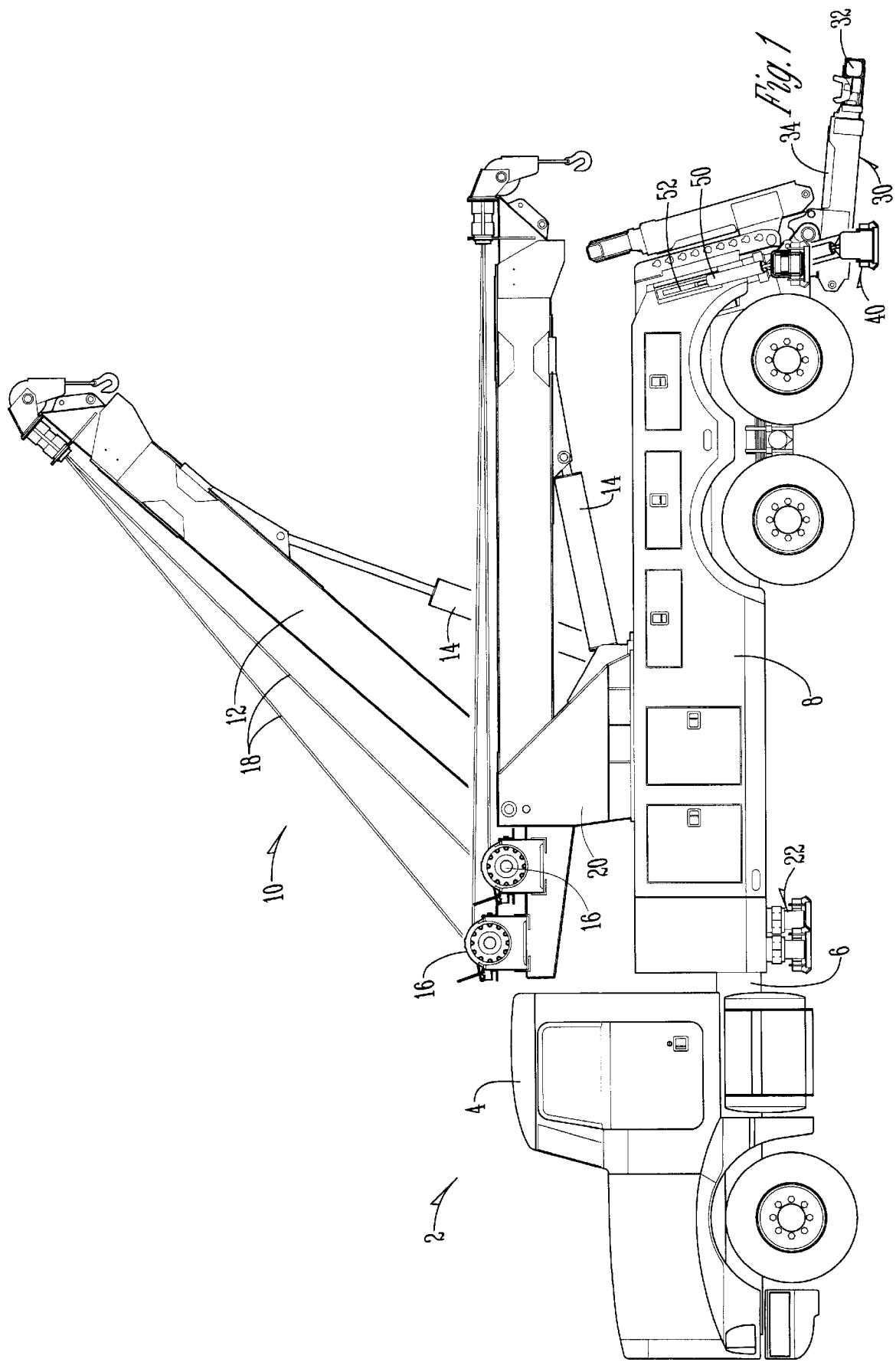
FIG. 1 is a side elevational view of a rotator showing the outriggers of the present invention mounted on the rear of the vehicle.
Figure 2:
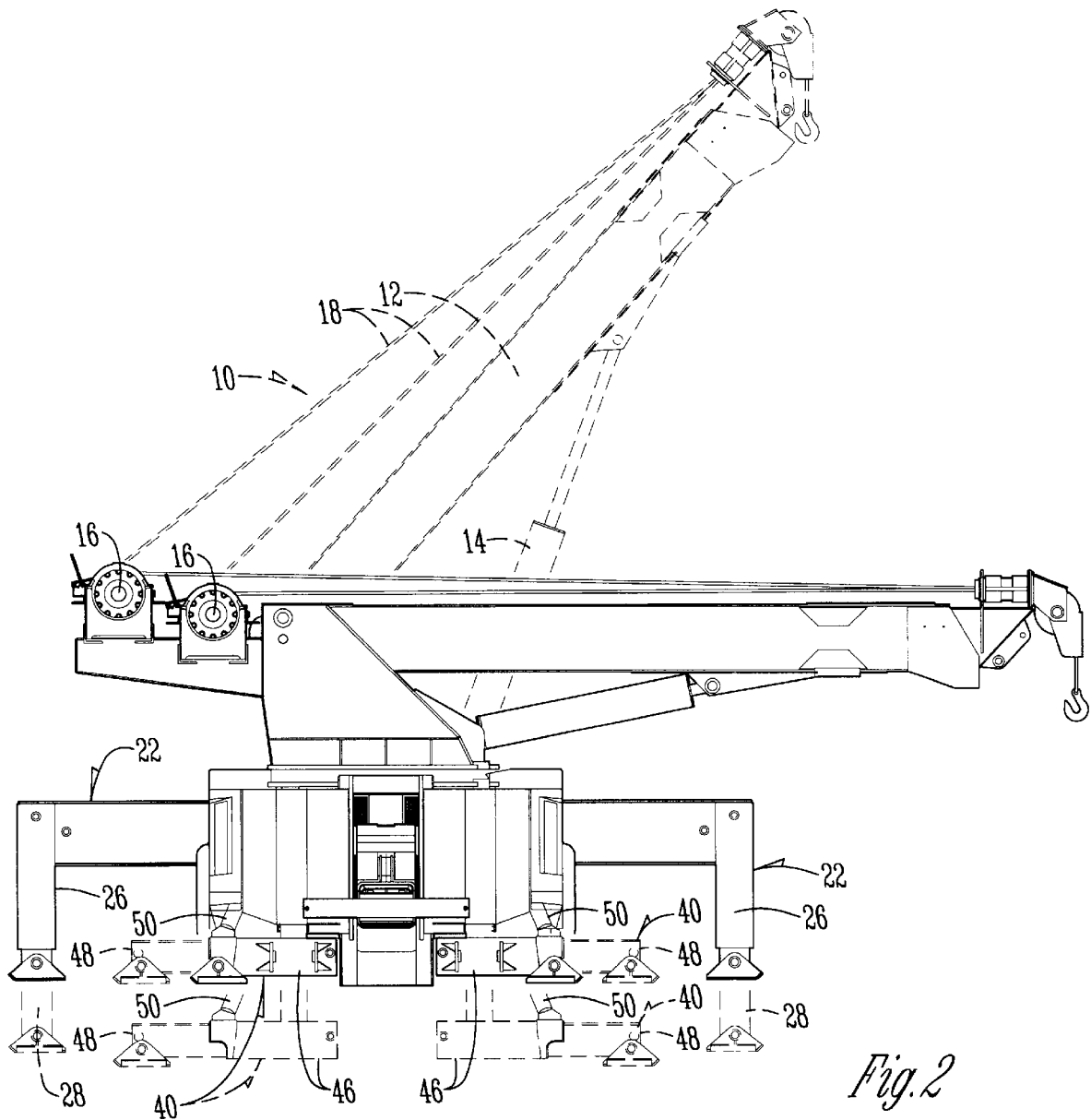
FIG. 2 is a rear elevational view of the rotator illustrated in FIG. 1 and showing the outriggers of the present invention.
Figure 3:
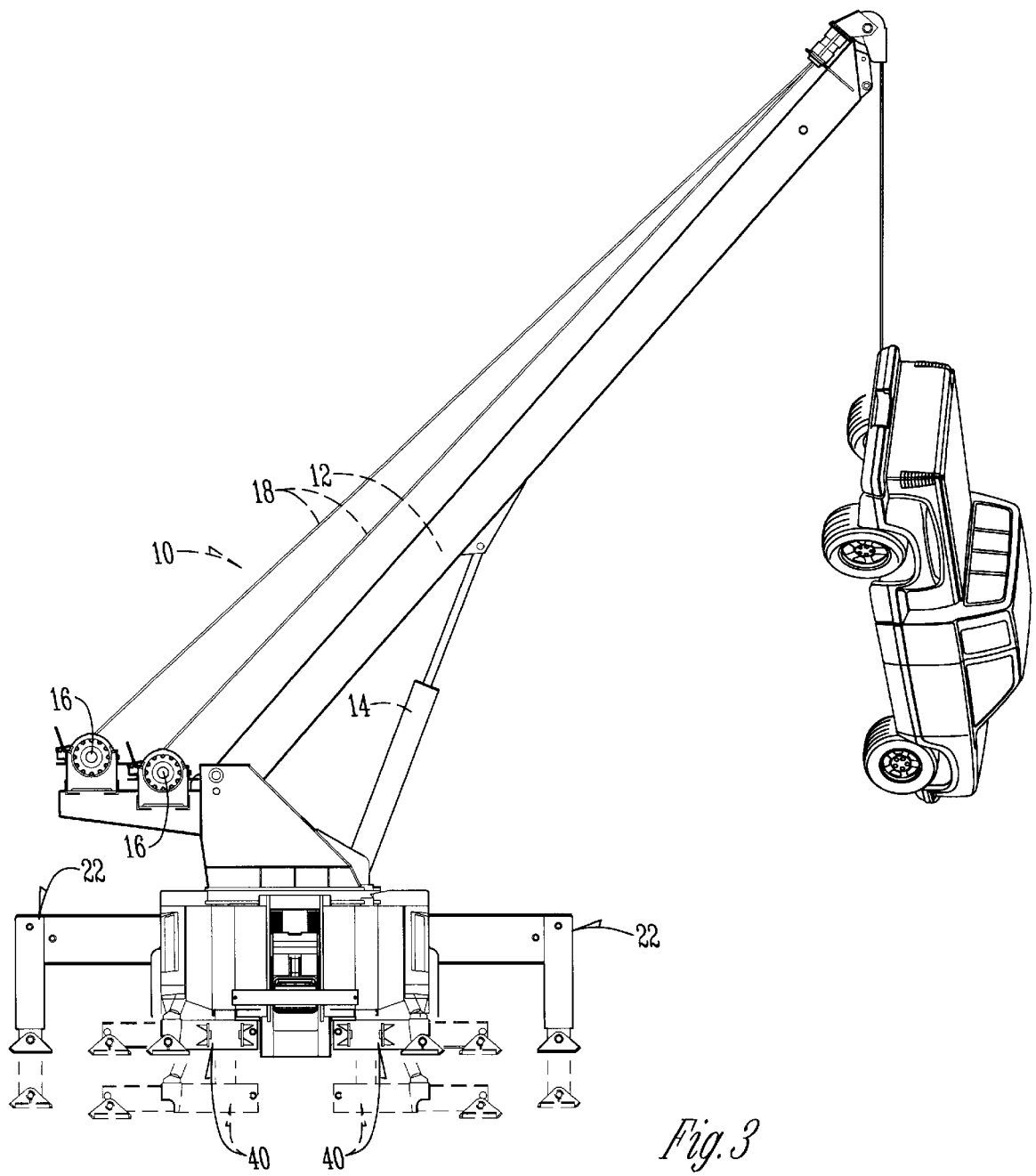
FIG. 3 is a rear elevational view of the rotator illustrated in FIG. 1 and using its boom.

Referring to the drawings, and more particularly to FIG. 1, the rotator 2 of the present invention includes a cab 4 and chassis 6. The sub-frame (not shown) is mounted on the chassis 6 and the body of the rotator 8 is fixed on the sub-assembly.

Wrecker assembly 10 includes boom 12 which is capable of elevating to an angle of approximately 50 degrees. Boom 12 is shown in both the elevated and transport positions in FIG. 1. Elevation of the boom is actuated by boom extend cylinder 14. Dual, variable speed hydraulic planetary winches 16 are included for operative movement of cables 18. Wrecker frame 20 is mounted for rotational movement about a 360 degree axis. Boom 12 includes both an inner and outer portion to allow for telescopic extension due to a hydraulic boom extend cylinder (not shown).

Front outriggers 22 can be retracted into body 8 and generally stored therein until their use is required and extension away from the body is necessary. As best shown in FIG. 4, front outriggers 22 have an extension arm 24 which can be extended away from the body 8 of rotator 2. A dual position support arm has an outer portion 26 and an inner portion 28 which is hydraulically lowered to a supporting position wherein front outrigger pad 28 contacts, most commonly, the ground surrounding the rotator 2.

Rotator 2 also includes underlift 30 which generally attached to the sub-frame and chassis. The underlift is shown in FIG. 6 as is part of the functional rotator unit 2. Although the construction of the underlift is known in the prior art, it generally includes a cross bar 32 mounted on the end of a horizontal boom 34. The horizontal boom 34 is capable of telescopic extension as a result of a hydraulic cylinder contained therein. The boom shown is a three-stage extensible boom. Horizontal boom 34 is mounted on a bracket 35, sometimes referred to as a rabbit. Bracket 35 is adapted to receive rollers 36 and is raised and lowered generally perpendicular to the ground by lift chain 38. Cylinder 39 raises and lowers underlift 30. Underlift 30 is shown in FIG. 1 in both the stored position where it is folded against the rear of rotator 2 and in an unfolded position prior to use.

Rear outriggers 40 are best viewed in FIGS. 4 and 5. Rear outriggers 40 are sometimes referred to as spades as a spade attachment (not shown) is capable of being mounted thereon for digging into more porous ground for additional support. The rear outriggers 40 perform the function of stabilizing during operation and should be considered part of the complete functional rotator unit 2. The rear outrigger 40 generally includes an outer vertical weldment 42 and inner vertical weldment 44. A vertical extend cylinder (not shown) moves the inner vertical weldment 44 telescopically within the outer outer vertical weldment 42.

This movement occurs in a generally vertical and linear path, although in the preferred embodiment, the inner weldment 44 also extends away from the rear of the rotator body 8. The outer horizontal weldment 46 is mounted substantially perpendicularly to the inner vertical weldment 44 and inner horizontal weldment 48 is telescopically mounted therein. Strut 50 extends between the outer horizontal 46 and the inner vertical weldment 44 and provides additional support for the outrigger assembly 40. Outer vertical weldment 42 includes a slot 52 in which the upper portion of the strut 50 travels. The outrigger 40 can engage the ground in two locations, at the immediate pad 54 as well as outer pad 56. Intermediate pad 54 is mounted on the outer horizontal weldment 46. Outer pad 56 is pivotally mounted on the inner horizontal weldment about pivot 57. An extend cylinder 58 is mounted at one end to the outer horizontal weldment 46 and at another to the inner horizontal weldment 48 and, when actuated, can extend the inner horizontal weldment 48 outwardly away from rotator 2 to increase the support of the rear outrigger 40. In this way, a relatively greater outrigger spread or stance is achieved then with other designs, while still providing a minimal retracted width.

Thus, an improved outrigger support arrangement is disclosed having a simplified construction which provides the desired stability for the rotator of which it is apart while minimizing the overall retracted width of the arrangement. From the foregoing, it will be observed that numerous variations and modifications may be affected without the parting from the true spirit and scope of the novel concept of the present invention. It will be understood that no limitation with respect to the specific embodiment illustrated herein is intended or should be inferred. The terms and expressions which have been employed herein or used as terms of description not of limitation, and there is no intention in the use of such terms and expressions, of excluding any equivalents of the feature shown and described or portions thereof but it is recognized that various modifications are possible within the scope of the invention now claimed.

What is claimed is:

1. A hydraulic rear outrigger assembly comprised of at least two rear outriggers for a vehicle having a wrecker mounted thereon, the vehicle having a cab and chassis, a body and a sub-frame mounted to the chassis, and an underlift, each rear outrigger comprising:

an outer vertical weldment mounted on the sub-frame, the outer vertical weldments of each rear outrigger being substantially parallel to each other;

an inner vertical weldment positioned for slidable movement within the outer vertical weldment;

a first hydraulic piston operatively positioned for moving the inner vertical weldment between an extended and a retracted position, said inner vertical weldment moving rearward from the retracted position to the extended position;

an outer horizontal weldment mounted on the inner vertical weldment;

an inner horizontal weldment positioned for slidable movement with the outer horizontal weldment; and a second hydraulic piston operatively positioned for moving the inner horizontal weldment between an extended retracted position and a variably extensible independent and substantially perpendicular of the first hydraulic piston.

2. The assembly of claim 1 wherein the outer horizontal weldment extends away from the chassis.

3. The assembly of claim 2 wherein the outer horizontal weldment is generally perpendicular to the inner vertical weldment.

4. The assembly of claim 3 wherein the second hydraulic piston is connected at one end to the outer horizontal weldment and connected at a second end to the inner horizontal weldment.

5. The assembly of claim 4 further comprising a support strut extending between the inner vertical weldment and the outer horizontal weldment.

6. The assembly of claim 5 wherein the outer vertical weldment includes a slot for slidable receipt of the strut.

7. A rotator comprising:

a cab and chassis having a sub-frame mounted thereon;

a wrecker body mounted to the sub-frame;

an extendable and rotatable boom mounted to the sub-frame;

an underlift mounted to the sub-frame;

at least two front outriggers mounted to the sub-frame having a first portion capable of movement between an extended and retracted position by a first piston, and a second portion capable of movement between a retracted position and a grounded engaging position by a second piston; and at least two rear outriggers mounted to the sub-frame having a first portion capable of independent rear ward movement between a retracted to a ground engaging position by a third piston, the first portions of each rear outrigger traveling in substantially parallel paths, and a second portion capable of variable extensible independent movement substantially perpendicular from the first portion between an extended position and a retracted position by a fourth piston.

8. The rotator of claim 7 wherein the second portion of the rear outrigger is a two-stage extensible arm.

9. The rotator of claim 8 wherein the first portion of the rear outrigger is a two-stage extensible arm.

10. The rotator of claim 9 wherein the first and second portions of the rear outrigger are generally disposed in perpendicular alignment.

11. The rotator of claim 10 wherein the second portion of the outrigger is capable of extending away from the wrecker body.

12. The rotator of claim 11 wherein the first portion of the rear outrigger is capable of extending at an angle away from the wrecker body to the ground engaging position.

13. The rotator of claim 12 further comprising hydraulic means for effectuating movement of the pistons of the first portion and the second portion of the rear outrigger.

14. In a system for stabilizing a vehicle having a wrecker mounted thereon, the vehicle having a cab and chassis, a body and sub-frame mounted to the chassis, and an underlift, the improvement comprising:

at least two rear outriggers, each having a first hydraulic cylinder moving a first arm extending generally rearward and downward to the ground engaging position, and a second hydraulic cylinder moving a second arm capable of variable extension in a substantially horizontal direction perpendicular from the first arm and away to the vehicle to be stabilized, the first arm of each outrigger being substantially parallel and capable of independent movement with respect to the second hydraulic arms.

15. The stabilization system of claim 14 wherein the downward extension of first arm is at an acute angle from vertical.

* * * * *